(12) United States Patent
Yamakaji et al.

(10) Patent No.: US 8,715,525 B2
(45) Date of Patent: May 6, 2014

(54) MANUFACTURING METHOD OF ELECTRODE MATERIAL

(75) Inventors: Masaki Yamakaji, Kanagawa (JP); Takuya Miwa, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 224 days.

(21) Appl. No.: 13/170,539

(22) Filed: Jun. 28, 2011

(65) Prior Publication Data

US 2012/0001120 A1    Jan. 5, 2012

(30) Foreign Application Priority Data

Jun. 30, 2010  (JP) ................... 2010-149417

(51) Int. Cl.
*H01M 4/88*  (2006.01)
(52) U.S. Cl.
USPC ............... 252/182.1; 252/500; 423/327.1; 423/332; 429/221
(58) Field of Classification Search
USPC ............... 252/182.1, 500; 423/332, 327.1; 429/221
See application file for complete search history.

(56) References Cited

U.S. PATENT DOCUMENTS

| | | | |
|---|---|---|---|
| 5,720,859 A | 2/1998 | Czubarow et al. | |
| 5,770,018 A | 6/1998 | Saidi | |
| 5,951,831 A | 9/1999 | Godber et al. | |
| 5,985,237 A | 11/1999 | Lu et al. | |
| 6,093,503 A | 7/2000 | Isoyama et al. | |
| 6,348,182 B1 | 2/2002 | Lu et al. | |
| 6,730,434 B1 | 5/2004 | Kawakami et al. | |
| 6,872,492 B2 | 3/2005 | Barker et al. | |
| 6,962,613 B2 | 11/2005 | Jenson | |
| 7,060,238 B2 | 6/2006 | Saidi et al. | |
| 7,288,791 B2 | 10/2007 | Umeno et al. | |
| 7,307,248 B2 | 12/2007 | Hargett, Jr. et al. | |

(Continued)

FOREIGN PATENT DOCUMENTS

| | | |
|---|---|---|
| EP | 0 913 876 A1 | 5/1999 |
| EP | 1 722 428 A1 | 11/2006 |

(Continued)

OTHER PUBLICATIONS

Zhou, F. et al, "The Li Intercalation Potential of LiMPO$_4$ and LiMSiO$_4$ Olivines with M=Fe, Mn, Co, Ni," Electrochemistry Communications, vol. 6, No. 11, Nov. 2004, pp. 1144-1148.

(Continued)

*Primary Examiner* — Khanh Tuan Nguyen
(74) *Attorney, Agent, or Firm* — Husch Blackwell LLP (57) ABSTRACT

One object is to provide a manufacturing method of an electrode material with which a characteristic of a power storage device can be improved. In a manufacturing method of an electrode material comprising a compound represented by a general formula $A_{2-a}MSiO_4$ (A represents an alkali metal, M represents a transition metal, and a represents $0 \leq a < 2$), a mixed material is formed by mixing a compound that is a supply source of A, a compound that is a supply source of M, and a compound that is a supply source of Si; a flux is mixed into the mixed material after the mixed material is subjected to a heat treatment at a temperature of 400° C. or lower and pulverized; and the mixed material into which the flux is mixed is subjected to a heat treatment at a temperature of 700° C. or lower in an inert gas atmosphere.

15 Claims, 8 Drawing Sheets

(56) References Cited

U.S. PATENT DOCUMENTS

| | | |
|---|---|---|
| 7,582,383 B2 | 9/2009 | Kasai et al. |
| 7,749,658 B2 | 7/2010 | Isono et al. |
| 7,759,008 B2 | 7/2010 | Barker et al. |
| 8,021,783 B2 | 9/2011 | Tabuchi et al. |
| 8,066,916 B2 | 11/2011 | Levasseur et al. |
| 8,105,508 B2 | 1/2012 | Levasseur et al. |
| 8,148,013 B2 | 4/2012 | Chiang et al. |
| 8,334,676 B2 | 12/2012 | Hara et al. |
| 8,349,217 B2 * | 1/2013 | Yamada et al. ............... 252/500 |
| 2004/0016632 A1 | 1/2004 | Barker |
| 2004/0241540 A1 | 12/2004 | Tsutsumi et al. |
| 2005/0238961 A1 | 10/2005 | Barker et al. |
| 2007/0072034 A1 | 3/2007 | Barker et al. |
| 2007/0160519 A1 | 7/2007 | Barker et al. |
| 2007/0280848 A1 | 12/2007 | Narayan et al. |
| 2008/0138709 A1 | 6/2008 | Hatta et al. |
| 2009/0117020 A1 | 5/2009 | Manthiram et al. |
| 2009/0138862 A1 | 5/2009 | Tanabe et al. |
| 2009/0142668 A1 | 6/2009 | Ishii |
| 2009/0262308 A1 | 10/2009 | Ogawa |
| 2009/0286159 A1 | 11/2009 | Nuspl et al. |
| 2010/0065787 A1 | 3/2010 | Armand et al. |
| 2010/0086855 A1 | 4/2010 | Kohmoto et al. |
| 2010/0159333 A1 | 6/2010 | Sugiura et al. |
| 2010/0203389 A1 | 8/2010 | Yoshida |
| 2010/0273056 A1 | 10/2010 | Kanda et al. |
| 2010/0297496 A1 | 11/2010 | Ravet et al. |
| 2010/0304217 A1 | 12/2010 | Suzuki et al. |
| 2010/0323231 A1 | 12/2010 | Sakai et al. |
| 2011/0008233 A1 | 1/2011 | Miyanaga et al. |
| 2011/0031105 A1 | 2/2011 | Miyanaga |
| 2011/0065004 A1 | 3/2011 | Murakami et al. |
| 2011/0229764 A1 | 9/2011 | Kawakami et al. |
| 2012/0003139 A1 | 1/2012 | Kawakami et al. |
| 2012/0183839 A1 | 7/2012 | Yuasa et al. |

FOREIGN PATENT DOCUMENTS

| | | | |
|---|---|---|---|
| EP | 2 214 248 A1 | 8/2010 | |
| EP | 2 239 806 A1 | 10/2010 | |
| JP | 5-171417 | 7/1993 | |
| JP | 11-25983 | 1/1999 | |
| JP | 2001-167762 | 6/2001 | |
| JP | 2003-257429 | 9/2003 | |
| JP | 2004-79276 | 3/2004 | |
| JP | 2005-50684 | 2/2005 | |
| JP | 2007-335325 | 12/2007 | |
| JP | 2008-218303 * | 9/2008 | ............. H01M 4/04 |
| JP | 2008-260666 | 10/2008 | |
| JP | 2008-285372 | 11/2008 | |
| JP | 2009-4289 | 1/2009 | |
| JP | 2009-4371 | 1/2009 | |
| JP | 2009-104983 | 5/2009 | |
| JP | 2009-266813 | 11/2009 | |
| JP | 2010-3700 | 1/2010 | |
| WO | WO 2009/066782 A2 | 5/2009 | |

OTHER PUBLICATIONS

Hirayama, M. et al, "Direct Observation of the Bulk and Surface Structure of LiFePO$_4$ Epitaxial Thin Film," Abstracts of the Annual Meeting of the Electrochemical Society of Japan, vol. 75, Mar. 29, 2008, p. 21 (with English translation).

Kang, B. et al., "Battery Materials for Ultrafast Charging and Discharging," Nature, vol. 458, No. 12, Mar. 12, 2009, pp. 190-193.

Suzuki, K. et al, "Synthesis of LiFePO$_4$ Epitaxial Thin Film and Characterization of the Bulk and Surgace Structural Changes," Abstracts of the Annual Meeting of the Electrochemical Society of Japan, vol. 76, Mar. 29, 2009, p. 332 (with English translation).

Feng, P. et al, "Synthesis and Characterizations of a Polymorphic Sodium Cobalt Phosphate with Edge-Sharing $CO_2^+$ Octahedral Chains," Journal of Solid State Chemistry, vol. 131, 1997, pp. 160-166.

Feng, P. et al, "Synthesis, Crystal Structure, and Magnetic Properties of a New Polymorphic Sodium Cobalt Phosphate with Trigonal Bipyramidal CO2+ and a Tunnel Structure," Journal of Solid State Chemistry, vol. 129, 1997, pp. 328-333.

Erragh, F. et al, "Sodium Nickel Polyphosphate," Acta Cryst., (Acta Crystallographica Section), vol. C54, 1998, pp. 1746-1747.

Yang, S. et al, "Hydrothermal Synthesis of Lithium Iron Phosphate Cathodes," Electrochemistry Communications, vol. 3, No. 9, 2001, pp. 505-508.

Burba, C.M. et al, "Vibrational Spectroscopic Investigation of Structurally-Related LiFePO$_4$, NaFePO$_4$, and FePO$_4$ Compounds," Spectrochimica Acta Part A, No. 65, 2006, pp. 44-50.

Chen, J. et al, "Hydrothermal Synthesis of Cathode Materials," Journal of Power Sources, vol. 174, 2007, pp. 442-448.

Murugan, A.V. et al, "One-Pot Microwave-Hydrothermal Synthesis and Characterization of Carbon-Coated LiMPO4 (M=Mn, Fe, and Co) Cathodes," Journal of the Electrochemical Society, vol. 156, No. 2, 2009, pp. A79-A83.

* cited by examiner

MANUFACTURING METHOD OF ELECTRODE MATERIAL

BACKGROUND OF THE INVENTION

1. Field of the Invention

The present invention relates to a manufacturing method of an electrode material.

2. Description of the Related Art

The field of portable electronic devices such as personal computers and cellular phones has progressed significantly. The portable electronic devices need a rechargeable power storage device that is small, light-weight, and reliable, which has a high energy density. As such a power storage device, a lithium ion secondary battery is known, for example. Also, development of electronically propelled vehicles on which a secondary battery is mounted has also been progressing rapidly due to growing awareness of environmental problems and energy problems.

In a lithium ion-secondary battery, the following and the like have been known as a positive electrode active material (see Patent Document 1, Non-Patent Document 1, and Non-Patent Document 2): a phosphate compound with an olivine structure containing lithium (Li) and iron (Fe), manganese (Mn), cobalt (Co), or nickel (Ni), such as lithium iron phosphate ($LiFePO_4$), lithium manganese phosphate ($LiMnPO_4$), lithium cobalt phosphate ($LiCoPO_4$), lithium nickel phosphate ($LiNiPO_4$), and the like.

Lithium iron phosphate is represented by the composition formula $LiFePO_4$, and $FePO_4$ which is obtained by taking lithium from $LiFePO_4$ is also stable; consequently, capacitance of a power storage device that is manufactured using the above material can be increased safely.

REFERENCE

Patent Document

[Patent Document 1] Japanese Published Patent Application No. H11-25983

Non-Patent Document

[Non-Patent Document 1] Byoungwoo Kang, Gerbrand Ceder, "Nature", 2009, Vol. 458 (12), p. 190-193

[Non-Patent Document 2] F. Zhou et al., "Electrochemistry communications", 2004, 6, p. 1144-1148

SUMMARY OF THE INVENTION

However, in a power storage device using the above-mentioned phosphate compound, the maximum insertion and desorption amount of lithium ions per 1 composition can only be 1 during charging and discharging, and an increase in capacitance of the power storage device has been limited.

Also, a high temperature treatment is necessary to manufacture a material of an electrode for the power storage device, and by the high temperature treatment, the electrode material is sintered and particles of the electrode material become large. This has caused problems of slow movement speed of lithium ions and charging and discharging taking a long time.

In view of the above problems, in one mode of the present invention, one object is to provide a manufacturing method of an electrode material that has 2 as a maximum insertion and desorption amount of lithium ions per 1 composition. Also, another object is to provide a manufacturing method of an electrode material which enlargement of its particles can be suppressed.

Another object is to provide a power storage device using the above-mentioned electrode material.

One mode of the present invention is a manufacturing method of an electrode material comprising a compound represented by a general formula $A_{2-a}MSiO_4$ (A represents an alkali metal, M represents a transition metal, and a represents $0 \leq a < 2$), wherein a mixed material is formed by mixing a compound that is a supply source of A of the general formula, a compound that is a supply source of M of the general formula, and a compound that is a supply source of Si of the general formula; a flux is mixed into the mixed material after the mixed material is subjected to a heat treatment at a temperature of 400° C. or lower and pulverized; and the mixed material into which the flux is mixed is subjected to a heat treatment at a temperature of 700° C. or lower in an inert gas atmosphere.

It is preferable that A is Li, and a is 0.

It is preferable that M is one of iron, manganese, cobalt, and nickel.

For the flux, one or a plurality of compounds selected from the following can be used: lithium chloride, sodium chloride, potassium chloride, rubidium chloride, calcium chloride, and magnesium chloride.

The inert gas atmosphere is preferably a gas atmosphere containing one or a plurality of the following gases: nitrogen, helium, neon, argon, and xenon.

By using a flux when synthesizing the material, a heat treatment at a low temperature can be performed in a short amount of time, and enlargement of particles of the electrode material can be suppressed. Accordingly, with the electrode material formed using a flux, smaller particles of the electrode material can be manufactured compared to an electrode material formed without using a flux. In the case of manufacturing a lithium ion secondary battery using the electrode material formed by using a flux, since the particles of the electrode material are small, sufficient speed can be obtained for the lithium ions during charging and discharging, and high-speed charging and discharging becomes possible. Also, since a heat treatment can be performed at a low temperature in a short amount of time, manufacturing cost can be reduced.

DETAILED DESCRIPTION OF THE INVENTION

Hereinafter, Embodiments will be described in detail with reference to the drawings. Note that the present invention is not limited to the description of Embodiments below, and it is apparent to those skilled in the art that modes and details can be modified in various ways without departing from the spirit of the invention disclosed in this specification and the like. Structures of different embodiments can be implemented in appropriate combinations. Note that in the structures of the present invention described below, common reference numerals are used for portions that are the same or have similar functions, and repeated description will be omitted.

Note that position, size, range, or the like of each component illustrated in drawings and the like may not accurately represent actual position, size, range, or the like, for the sake of easy comprehension. Therefore, the disclosed invention is not necessarily limited to the position, size, range, or the like disclosed in the drawings.

Note that terms with ordinal numbers such as "first," "second," and "third," in this specification are used in order to identify components, and the terms do not limit the components numerically.

Embodiment 1

In this embodiment, an example of a manufacturing method of an electrode material containing a compound represented by General Formula $A_{2-a}MSiO_4$ will be described.

First, a liquid solution is added to respective compounds serving as supply sources of A, M, and Si of the general formula and then mixed, to form a mixed material. Here, A in the general formula represents a lithium (Li) element, for example. Also, M in the general formula represents an element such as iron (Fe), manganese (Mn), cobalt (Co), or Nickel (Ni).

As the compound serving as the supply source of A in the general formula, the following compound can be used: lithium carbonate ($Li_2CO_3$), lithium oxide ($Li_2O$), lithium sulfide ($Li_2S$), lithium peroxide ($Li_2O_2$), lithium hydroxide (LiOH), lithium metasilicate ($Li_2SiO_3$), or the like. Also, as the compound serving as the supply source of M in the general formula, the following compound, for example, can be used: iron oxide (FeO), manganese oxide (MnO), cobalt oxide (CoO), nickel oxide (NiO), iron oxalate dihydrate ($FeC_2O_4.2H_2O$), manganese oxalate dihydrate ($MnC_2O_4.2H_2O$), cobalt oxalate dihydrate ($CoC_2O_4.2H_2O$), nickel oxalate dihydrate ($NiC_2O_4.2H_2O$), manganese carbonate ($MnCO_3$), or the like. Also, as the compound serving as the supply source of Si in the general formula, silicon oxide ($SiO_2$) can be used, for example. Note that in this embodiment, lithium carbonate is used as the compound serving as the supply source of A in the general formula, iron oxalate dihydrate is used as the compound serving as the supply source of M in the general formula, and silicon oxide is used as the compound serving as the supply source of Si in the general formula.

A compound containing lithium is used as the compound serving as the supply source of A in the general formula. This is because since ion radius of lithium is small, movement of lithium ions between electrodes is easy when performing charging and discharging of a power storage device. Also, by using an electrode material formed using lithium in a power storage device, maximum insertion and desorption amount of lithium ions or the like can be 2 per 1 composition. By having such a material as a positive electrode active material, capacitance of the power storage device can be increased, and this contributes to improvement in characteristic of the power storage device. Furthermore, by using a transition metal such as iron, manganese, cobalt, or nickel with a large oxidation-reduction potential for the compound serving as the supply source of M in the general formula, high discharging potential can be realized. Therefore, by using an oxide or an oxalate containing iron, manganese, cobalt, or nickel, an electrode material with high discharging capacitance can be manufactured, which contributes to improvement in characteristic of the power storage device.

As a method of mixing the compounds serving as the supply source of A, M, and Si in the general formula, there is a ball mill treatment. Specifically, in the method, a highly volatile solvent such as acetone is added to the compounds, and using a metal or ceramic ball (ball radius of ϕ1 mm or more and 10 mm or less), the treatment is performed with a revolution number of 50 rpm or more and 500 rpm or less, and for a revolution time of 30 minutes or more and 5 hours or less. By performing the ball mill treatment, the compounds can be microparticulated at the same as being mixed, and an electrode material (for example, $Li_2FeSiO_4$) after formation can be microparticulated. In addition, the compounds can be uniformly mixed by performing the ball mill treatment, and crystallinity of the electrode material after formation can be made high. Note that although acetone is used as the solvent, ethanol, methanol, or the like can be used instead.

Next, after heating the mixed material and evaporating the solvent, pressure is applied with a pellet press to form pellets, and a first heat treatment (pre-baking) is performed on the formed pellets.

For example, after heating the mixed material of the compounds (lithium carbonate, iron oxalate dihydrate, and silicon oxide) subjected to the ball mill treatment at 50° C. to evaporate the solvent (acetone), pressure of 14.7 MPa is applied with the pellet press for 5 minutes to form pellets. Then, the mixture that is molded into pellets is subjected to the first heat treatment (pre-baking) in a nitrogen atmosphere, at a baking temperature of 350° C., and for a baking time of 10 hours.

The heat treatment may be performed at 250° C. or higher and 450° C. or lower, preferably 400° C. or lower, for 1 hour or more and 20 hours or less, preferably 10 hours or less. By performing the first heat treatment (pre-baking) at a low temperature of 400° C. or lower, crystal growth can be suppressed at the same as forming crystal nucleuses. As a result, enlargement of particles of the electrode material can be suppressed.

Also, the heat treatment may be performed in an inert gas atmosphere. An inert gas described in this embodiment refers to a gas that does not react with the mixed material due to the heat treatment. As the inert gas, a rare gas (such as helium, neon, argon, or xenon), nitrogen, or the like can be used. Furthermore, one or a plurality of gases can be mixed and used as the inert gas. By performing the heat treatment in an inert gas atmosphere, oxidation of the mixed material can be prevented. For example, in the case of forming lithium iron silicate as the mixed material, by performing the heat treatment in an atmosphere containing oxygen, iron oxide is formed and composition is changed.

Next, the mixed material subjected to the heat treatment is pulverized and mixed with a flux.

For the flux, the following can be used, for example: an alkali metal chloride or alkali earth metal chloride such as lithium chloride, (LiCl), sodium chloride (NaCl), potassium chloride (KCl), rubidium chloride (RbCl), calcium chloride (CaCl), or magnesium chloride (MgCl). In this embodiment, lithium chloride is used as the flux.

As a method of mixing the pulverized mixed material and the flux, the same ball mill treatment as mentioned above can be used. For example, the treatment may be performed with a revolution number of 50 rpm or more and 500 rpm or less, and a revolution time of 30 minutes or more and 5 hours or less.

Next, the mixed material containing the flux is molded into pellets by applying pressure again with the pellet press, and the formed pellets are subjected to a second heat treatment. In the second heat treatment, the flux is liquefied. Conditions or the like of the pellet press may be the same as described above.

The second heat treatment may be performed at a temperature of 700° C. or lower (preferably 650° C. or lower), for 1 hour or more and 20 hours or less (preferably 10 hours or less). Note that the temperature of the second heat treatment is preferably higher than the temperature of the first heat treatment.

In the case that the flux is not mixed in, the heat treatment temperature of the second heat treatment is required to be a high temperature of 700° C. or higher. However, sintering of the mixed material occurs in a heat treatment of 700° C. or higher, and particles of the mixed material become large. On the other hand, if the flux is mixed, sufficient crystallization is possible with a heat treatment at a low temperature of 700° C. or lower and sintering of the mixed material can be prevented; consequently, enlargement of particles of the mixed material can be suppressed. By mixing the flux, reaction of the mixed material can be sped up, and the heat treatment at a low temperature becomes possible and heat treatment time can also be shortened. Furthermore, it is acceptable as long as the heat treatment temperature is equal to or higher than a melting point of the flux in the case that the flux is mixed in.

The heat treatment may be performed in an inert gas atmosphere in the same manner as described above.

Next, the flux contained in the mixed material subjected to the heat treatment is washed away with a solvent. As the solvent, warm water, water, ethanol, or the like can be used for example.

By the above steps, an electrode material in which enlargement of particles is suppressed can be formed by a low-temperature heat treatment in a short amount of time. In the case of forming a lithium secondary battery using the electrode material in which enlargement of particles is suppressed, sufficient speed of lithium ions can be obtained, and high speed charging and discharging becomes possible. Furthermore, when forming the electrode material, by the low-temperature heat treatment in a short amount of time becoming possible, manufacturing cost can be reduced.

Also, in the case of using, for example, a compound containing lithium as the compound serving as the supply source of A in the general formula, maximum insertion and desorption amount of lithium ions of the electrode material obtained in this embodiment can be 2 per 1 composition. By using such a material as an active material for the positive electrode, capacitance of the power storage device can be increased, and this contributes to improvement in characteristic of the power storage device.

Note that this embodiment can be implemented in appropriate combination with other embodiments.

Embodiment 2

In this embodiment, an example of a power storage device in which the electrode material described in Embodiment 1 is used as a positive electrode active material will be described. This embodiment will be described with reference to FIGS. 1A to 1C.

Figure 1A:
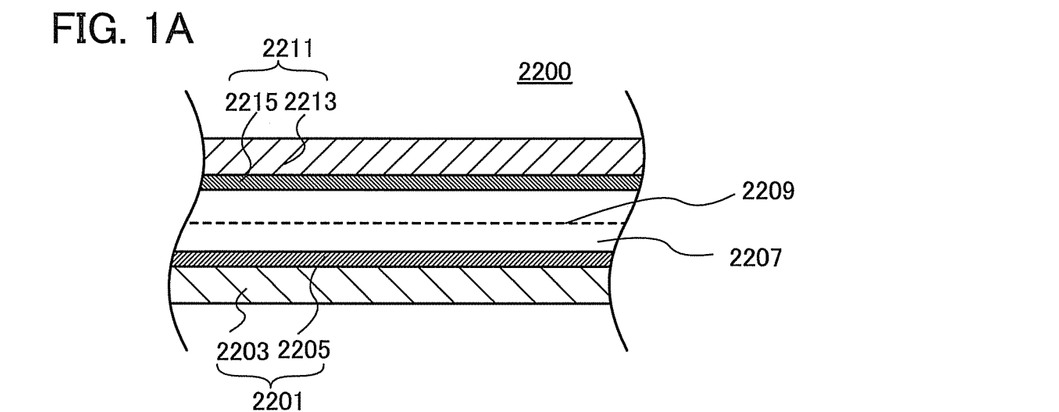
FIGS. 1A to 1C are cross-sectional views illustrating one example of a power storage device.

A portion of a structure of a power storage device 2200 is illustrated in FIG. 1A. The power storage device 2200 includes a positive electrode 2201 and a negative electrode 2211 provided which faces the positive electrode 2201 with an electrolyte 2207 interposed therebetween.

The positive electrode 2201 includes a collector 2203 and a positive electrode active material layer 2205 that is provided over the collector 2203. As a material of the collector 2203, a conductive material such as platinum, copper, titanium, aluminum, or the like can be used. As a material of the positive electrode active material layer 2205, a material described in Embodiment 1 can be used. Embodiment 1 can be referred to for materials and a formation method of the positive electrode active material layer 2205.

The negative electrode 2211 includes a collector 2213 and a negative electrode active material layer 2215 that is provided over the collector 2213. As a material of the collector 2213, a conductive material such as platinum, copper, titanium, or the like can be used. As a material of the negative electrode active material layer 2215, a carbon material such as graphite, a lithium metal, silicon, or the like can be used.

The electrolyte 2207 has a function of transporting a reactive material (such as lithium ions). A material of the electrolyte 2207 can be solid or liquid. In the case that the material of the electrolyte 2207 is solid, $Li_3PO_4$, $Li_xPO_yN_z$ (x, y, and z are positive real numbers) which is formed by mixing $Li_3PO_4$ with nitrogen, $Li_2S$—$SiS_2$, $Li_2S$—$P_2S_5$, $Li_2S$—$B_2S_3$, or the like can be used, for example. Alternatively, any of these doped with LiI or the like can be used. In the case that the material of the electrolyte 2207 is liquid, a solution containing a solvent and a solute (salt) dissolved in the solvent can be used. As the solvent, a cyclic carbonate such as propylene carbonate or ethylene carbonate, or a chain-like carbonate such as dimethyl carbonate or diethyl carbonate can be used. As the solute (salt), a light metal salt containing one or a plurality of the following can be used: $LiPF_6$, $LiBF_4$, LiTFSA, and the like.

In the case that the electrolyte 2207 is liquid, it is necessary to provide a separator 2209. The separator 2209 has a function of preventing contact between the positive electrode 2201 and the negative electrode 2211 as well as a function of allowing passage of a reactive material (such as lithium ions). As a material of the separator 2209, a material that does not dissolve in the electrolyte 2207 can be used, such as paper, nonwoven fabric, a glass fiber, nylon (such as polyamide), vinylon (a polyvinyl alcohol based fiber that is also referred to as "vinalon"), polypropylene, polyester, acrylic, polyolefin, polyurethane, or the like, for example. Furthermore, the separator 2209 may be provided even in the case of using a solid electrolyte as the electrolyte 2207.

Next, an example of charging and discharging in the case of using a lithium ion secondary battery as a power storage device is described with reference to FIG. 1B and FIG. 1C.

Figure 1B:
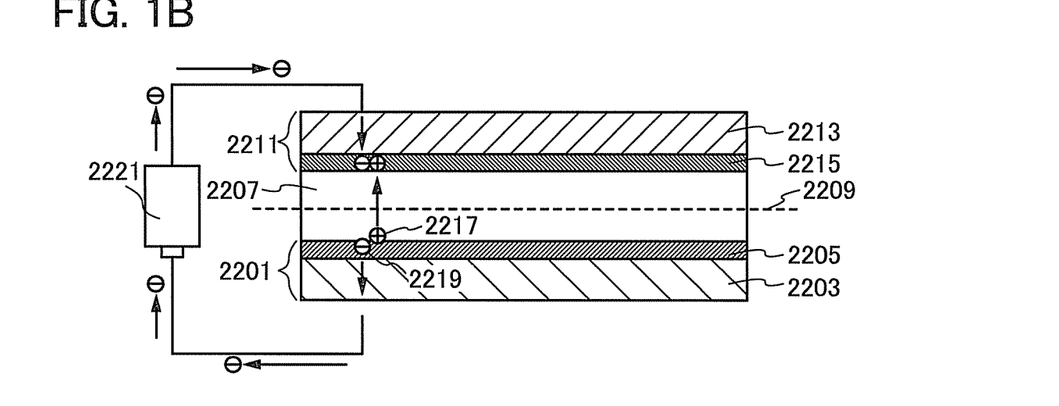

As shown in FIG. 1B, charging is performed by connecting a power source 2221 between the positive electrode 2201 and the negative electrode 2211. When voltage is applied from the power source 2221, lithium in the positive electrode 2201 is ionized and extracted from the positive electrode 2201 as a lithium ion 2217 and an electron 2219 is generated. The lithium ion 2217 moves to the negative electrode 2211 through the electrolyte 2207. The electron 2219 moves to the negative electrode 2211 through the power source 2221.

Then, the lithium ion 2217 receives the electron 2219 in the negative electrode 2211 and is inserted into the negative electrode 2211 as lithium.

Figure 1C:
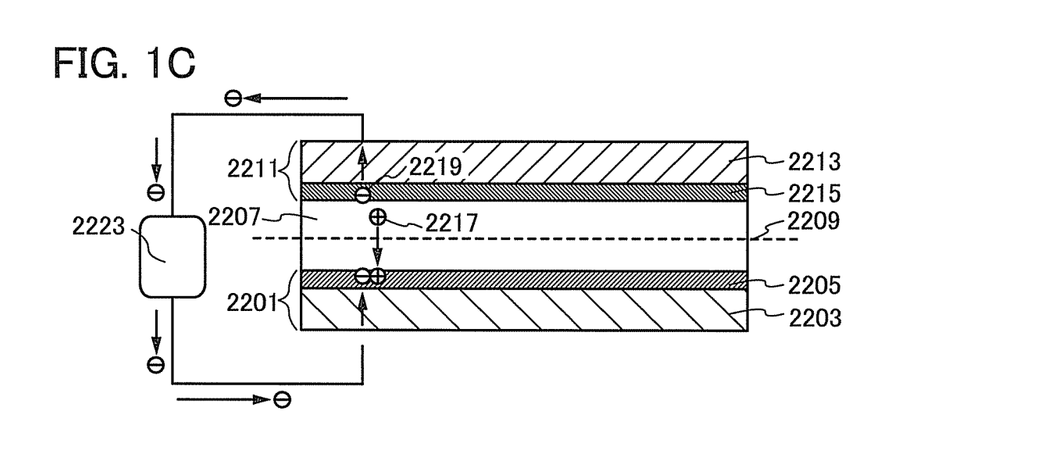

As shown in FIG. 1C, discharging is performed by connecting a load 2223 between the positive electrode 2201 and the negative electrode 2211. Lithium in the negative electrode 2211 is ionized and extracted from the negative electrode 2211 as the lithium ion 2217 and the electron 2219 is generated. The lithium ion 2217 moves to the positive electrode 2201 through the electrolyte 2207. The electron 2219 moves to the positive electrode 2201 through the load 2223. Then, the lithium ion 2217 receives the electron 2219 in the positive electrode 2201 and is inserted into the positive electrode 2201 as lithium.

In the above manner, charging and discharging are performed by movement of lithium ions between the positive electrode 2201 and the negative electrode 2211. In the positive electrode 2201 of the power storage device 2200, the material described in Embodiment 1 is used for the positive electrode active material layer 2205.

By using a flux when synthesizing the material, a low-temperature heat treatment that is performed in a short amount of time becomes possible, and enlargement of particles of the electrode material can be suppressed. Accordingly, in the case of using in a lithium ion secondary battery an electrode that is formed using a material in which enlargement of particles is suppressed, sufficient speed of lithium ions can be obtained, high-speed charging and discharging become possible, and a characteristic of the power storage device can be improved. Also, by a low-temperature heat treatment that is performed in a short amount time becoming possible, manufacturing cost can be reduced.

This embodiment can be implemented in appropriate combination with other embodiments.

Embodiment 3

In this embodiment, a power storage device with a different structure from the structure of the power storage device in Embodiment 2 will be described with reference to FIGS. 2A to 4B.

As a negative electrode active material layer of the power storage device, a carbon material such as graphite has been already put to practical use. However, the theoretical capacity of a carbon material is limited and it is difficult to obtain higher capacitance than what is already been put to practical use in the power storage device. In view of this, in this embodiment, characteristic improvement of the power storage device is realized by using a silicon material for the negative electrode active material layer. Also, by using the material described in Embodiment 1 for the positive electrode active material, further characteristic improvement of the power storage device is realized.

A formation method of the negative electrode is illustrated in FIGS. 2A to 2D. As a structure of the power storage device, the structure illustrated in FIGS. 1A to 1C can be applied. Furthermore, the negative electrode described in this embodiment corresponds to the negative electrode 2211 in FIGS. 1A to 1C.

Figure 2A:
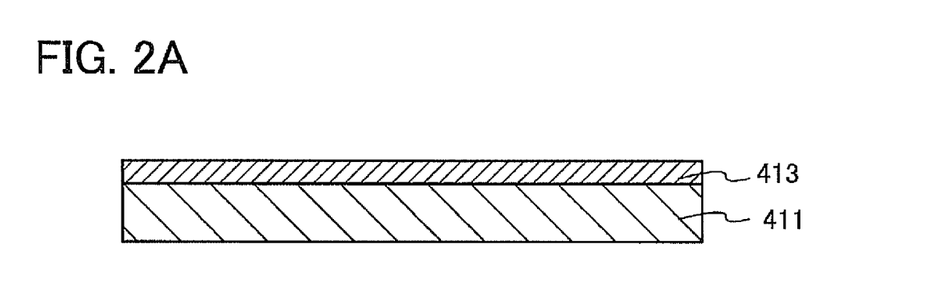
FIGS. 2A to 2D are cross-sectional views illustrating a manufacturing method of a negative electrode of a power storage device.

First, an amorphous silicon layer 413 is formed over a negative electrode collector 411 (see FIG. 2A).

For the negative electrode collector 411, a material with high conductivity such as titanium, nickel, copper, indium, tin, or silver can be used. In this embodiment, titanium is used for the negative electrode collector 411.

The amorphous silicon layer 413 can be formed using, for example, a plasma CVD method, a low-pressure CVD method, a sputtering method, a vacuum evaporation method, or the like, to have a thickness in a range of 100 nm or more and 5 μm or less (preferably 1 μm or more and 3 μm or less). If the film thickness of the amorphous silicon layer 413 is thinner than 100 nm, the thickness of a negative electrode active material layer 417 that is obtained after crystallization becomes so thin that in some cases charging and discharging cannot be performed. If the film thickness of the amorphous silicon layer 413 is thicker than 5 μm, there is concern that the amorphous silicon layer 413 may not become completely crystallized. Furthermore, if the film thickness of the amorphous silicon layer 413 is thicker than 5 μm, there is concern for peeling of the negative electrode active material layer 417 obtained after crystallization, due to stress change during charging and discharging. Accordingly, the film thickness of the amorphous silicon layer 413 is preferably in the above-described range.

Figures 2B, 2C:
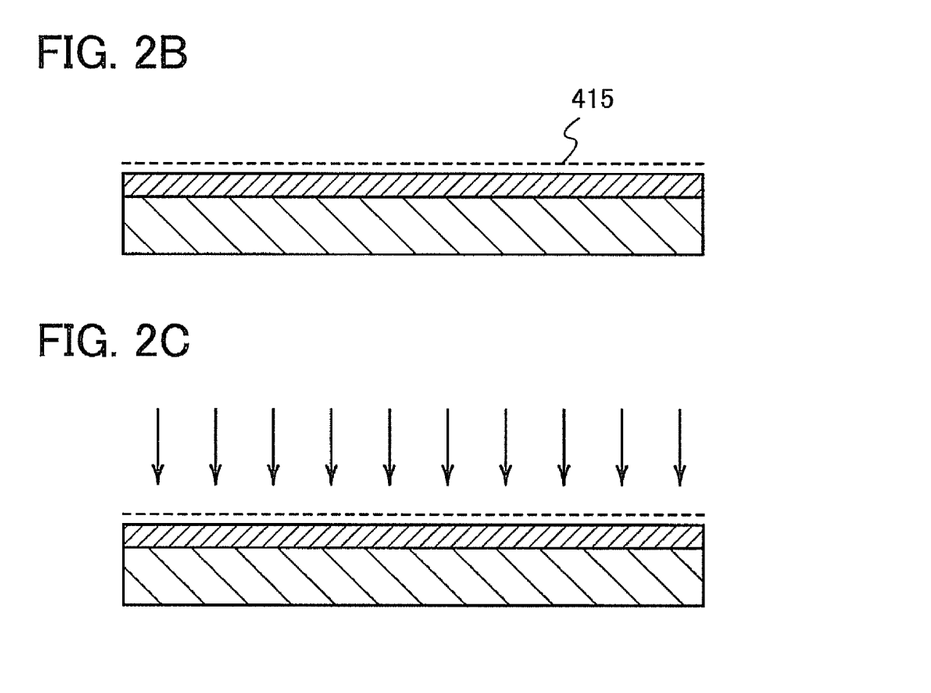

Next, a catalyst element 415 is added to the amorphous silicon layer 413 (see FIG. 2B).

As an adding method of the catalyst element 415, there is for example a coating method, a sputtering method, a vacuum evaporation method, or the like. By using the above method, the catalyst element 415 can be directly attached to a surface of the amorphous silicon layer 413.

By adding the catalyst element to the amorphous silicon layer, a processing temperature and a processing time of a crystallization that is performed later can be lowered and shortened. Specifically, the processing temperature of the crystallization can be reduced by about 50° C. to 100° C., and the processing time can be shortened to about ⅕ to ​1/10.

As the catalyst element 415, an element that promotes crystallization of amorphous silicon can be used, such as one or a plurality of the following metal elements: nickel (Ni), copper (Cu), indium (In), tin (Sn), silver (Ag), and the like, for example. Nickel is extremely excellent as the catalyst element in points of effectiveness and repeatability. In the case that nickel is used as the catalyst, nickel silicide is formed when amorphous silicon is crystallized, and this functions as a crystal nucleus when amorphous silicon is crystallized. In this embodiment, nickel is used as the catalyst element 415. A specific method of adding nickel will be described below with reference to FIGS. 3A and 3B.

Figure 3A:
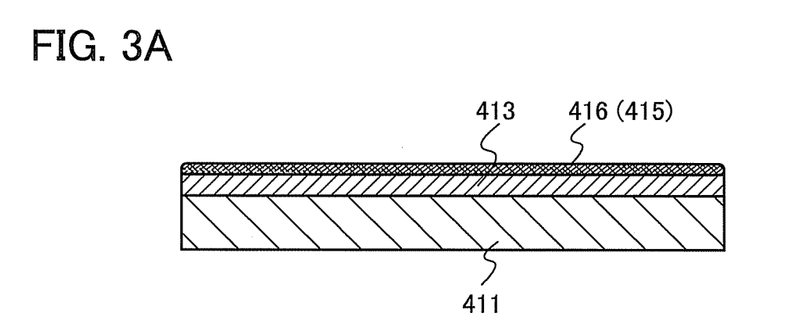
FIGS. 3A and 3B are cross-sectional views illustrating a manufacturing method of a negative electrode of a power storage device.

First, over a surface of the amorphous silicon layer 413 that is formed over the negative electrode collector 411, a solution 416 containing the catalyst element 415 is added (see FIG. 3A).

As the solution 416, a nickel acetate solution, a nickel hydrochloride solution, a nickel nitrate solution, a nickel sulfate solution, or the like can be used. In this embodiment, a nickel acetate solution will be used as the solution 416.

Figure 3B:
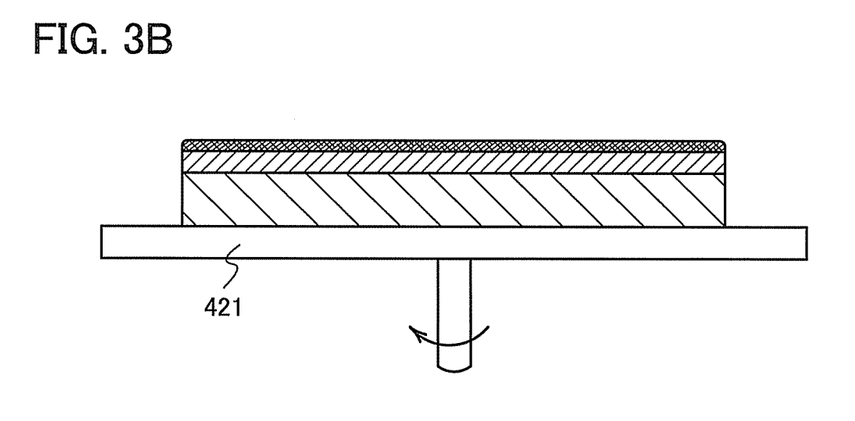

Next, a spinner 421 is used to perform spin drying (see FIG. 3B).

By performing spin drying, the solution 416 containing the catalyst element 415 can be uniformly kept on the surface of the amorphous silicon layer 413. Also, before adding the solution 416, a thin oxide layer is preferably formed over the surface of the amorphous silicon layer 413. This is because when the solution 416 contains water, the solution 415 is repelled by the hydrophobic surface of the amorphous silicon layer 413 and the catalyst element 415 cannot be added to the whole surface of the amorphous silicon layer 413 in some cases. By forming a thin oxide layer over the surface of the amorphous silicon layer 413, the surface can have higher wettability with respect to the solution 416 (the surface can be hydrophilic). As a method of forming the oxide layer, there is a method of irradiating the surface of the amorphous silicon layer 413 with UV light; a method of treating the surface of the amorphous silicon layer 413 with ammonia hydrogen peroxide water, ozone water, or the like; or the like. An oxide layer formed by such a method is extremely thin, and the catalyst element 415 can reach the amorphous silicon layer 413 through the oxide layer.

In the above manner, the catalyst element 415, which is nickel, can be added to the amorphous silicon layer 413.

Next, the amorphous silicon layer 413 to which the catalyst element 415 is added is subjected to a heat treatment (see FIG. 2C).

A heat treatment method for crystallizing the amorphous silicon layer 413 is a method using a heating furnace, a method of light irradiation using a laser beam, or the like, for example. In the case of performing the heat treatment in a heating furnace, a temperature can be set in a range of 450° C. or higher and 750° C. or lower, preferably 550° C. or higher and 620° C. or lower. Further, heat treatment time can be set in a range of 1 hour or more and 24 hours or less, preferably 4 hours or more and 10 hours or less. For example, the heat treatment may be performed at 550° C. for 4 hours. In the case of performing the heat treatment by irradiation with a laser beam, energy density can be set in a range of 100 mJ/cm$^2$ or more and 400 mJ/cm$^2$ or less, preferably 200 mJ/cm$^2$ or more and 400 mJ/cm$^2$ or less, and typically 250 mJ/cm$^2$. For example, a laser beam (wavelength of 248 nm and a pulse width of 20 nsec) of a KrF excimer laser is used to perform the heat treatment.

Figure 2D:
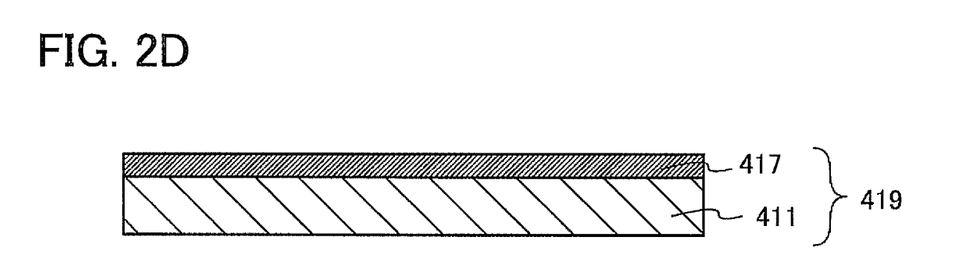

By the above heat treatment, the amorphous silicon layer 413 is crystallized, and becomes a crystalline silicon layer (the negative electrode active material layer 417) (see FIG. 2D).

The crystalline silicon layer obtained by the heat treatment can be used as the negative electrode active material layer. Also, the negative electrode collector 411 and the crystalline silicon layer (the negative electrode active material layer 417) that is formed over the negative electrode collector 411 can be used as a negative electrode 419. By using crystalline silicon in the negative electrode active material layer, diffusion rate of a reactive material (such as lithium ions) is higher than in the case of using amorphous silicon, and this can lead to further improvement in a characteristic of a power storage device.

The catalyst element 415 in the amorphous silicon layer 413 is moved by the heat treatment and functions as a crystal nucleus. Accordingly, crystallization can be promoted. For example, in the case of using nickel as the catalyst element 415, nickel reacts with amorphous silicon by the heat treatment to form nickel silicide, and the nickel silicide becomes a crystal nucleus and contributes to crystal growth thereafter. With this, crystallization is promoted, and a processing temperature and a processing time of crystallization can be lowered and shortened. By the lowering of the processing temperature and shortening of the processing time of the crystallization becoming possible, manufacturing cost can be reduced and productivity can be increased.

Also, the catalyst element 415 remaining on the crystalline silicon layer does not need to be removed since it is a metal element with a conductive property.

After the heat treatment, there are cases in which the catalyst element is segregated at the outermost surface of the crystalline silicon layer (the negative electrode active material layer 417). In this case, in the crystalline silicon layer, the concentration of the catalyst element 415 is higher in a region closer to the surface in a depth direction (film thickness direction). Further, the catalyst element 415 is oxidized by the heat treatment, and becomes a conductive oxide. For example, in the case of using nickel, copper, indium, tin, silver, or the like as the catalyst element 415, nickel oxide, copper oxide, indium oxide, tin oxide, silver oxide, or the like becomes segregated at the outermost surface of the crystalline silicon layer.

Figure 4A:
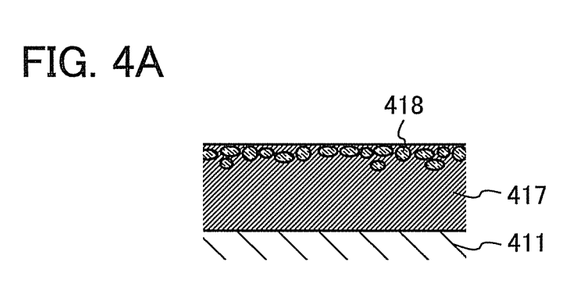
FIGS. 4A and 4B are cross-sectional views each illustrating a negative electrode of a power storage device.
Figure 4B:
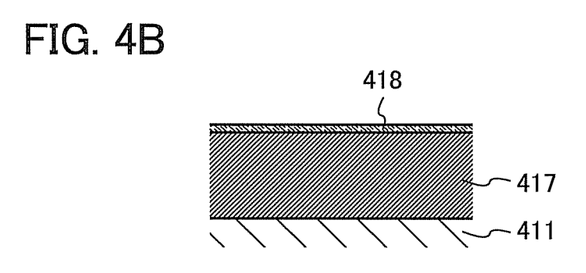

FIGS. 4A and 4B illustrate segregation of a conductive oxide 418 at the outermost surface of the negative electrode active material layer 417 (crystalline silicon layer). In FIG. 4A, the conductive oxide 418 is segregated in a granular form at the outermost surface of the negative electrode active material layer 417. In FIG. 4B, the conductive oxide 418 is segregated in a layer form at the outermost surface of the negative electrode active material layer 417. Since the conductive oxide 418 has a conductive property, a conductive property of the negative electrode active material layer 417 can be increased.

In the above manner, the negative electrode 419 in which the crystalline silicon layer is used as the negative electrode active material layer can be formed.

A positive electrode of a power storage device is formed using the electrode material described in Embodiment 1. By using a flux when synthesizing the electrode material, a low-temperature heat treatment that is performed in a short amount of time becomes possible, and enlargement of particles of the electrode material can be suppressed. Accordingly, in the case of using in a lithium ion secondary battery an electrode that is formed using a material in which enlargement of particles is suppressed, sufficient speed of lithium ions can be obtained, high-speed charging and discharging become possible, and a characteristic of the power storage device can be improved. Also, by a low-temperature heat treatment that is performed in a short amount time becoming possible, manufacturing cost can be reduced. For a formation method of the positive electrode, refer to Embodiment 1. Furthermore, for an electrolyte, refer to Embodiment 2.

In the above manner, by using the negative electrode described in this embodiment and the positive electrode using the electrode material described in Embodiment 1, a power storage device capable of high-speed charging and discharging can be formed.

Note that this embodiment can be appropriately combined with other embodiments.

Embodiment 4

In this embodiment, a power storage device with a different structure from the structures of the power storage devices in Embodiment 2 and Embodiment 3 will be described.

In Embodiment 3, an example is described in which the crystalline silicon layer serving as the negative electrode active material layer 417 is obtained in the following manner: the amorphous silicon layer 413 is formed over the negative electrode collector 411, the electrolyte element 415 is added to the amorphous silicon layer 413, and the amorphous silicon layer 413 is then crystallized by a heat treatment. In this embodiment, an example is described in which a crystalline silicon layer serving as a negative electrode active material layer is formed by utilizing the negative electrode collector itself as a catalyst element.

Figure 5A:
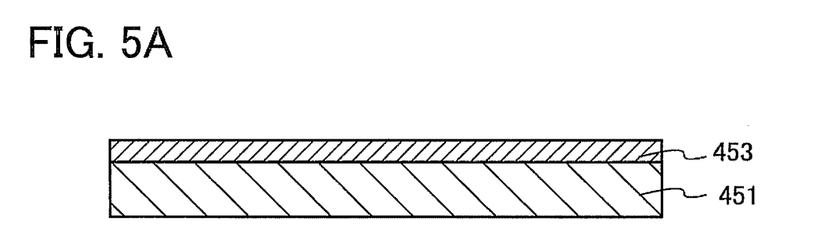
FIGS. 5A and 5B are cross-sectional views illustrating a manufacturing method of a negative electrode of a power storage device.

First, an amorphous silicon layer 453 is formed over a negative electrode collector 451 (see FIG. 5A).

The negative electrode collector 451 is formed using a material containing one or a plurality of catalyst elements which promote crystallization of an amorphous silicon layer, and has a conductive property. For the catalyst element, refer to Embodiment 3. Furthermore, for the negative electrode collector 451, a simple catalyst element or an alloy of a catalyst element and another material may be used. In the case of using an alloy for the negative electrode collector 451, a material which does not form an alloy with lithium is preferably selected. This is because if a material which forms an alloy with lithium is used, there is concern that stability of the negative electrode collector 451 itself is decreased.

The amorphous silicon layer 453 can be formed in the same manner as the amorphous silicon layer 413 described in Embodiment 3.

Figure 5B:
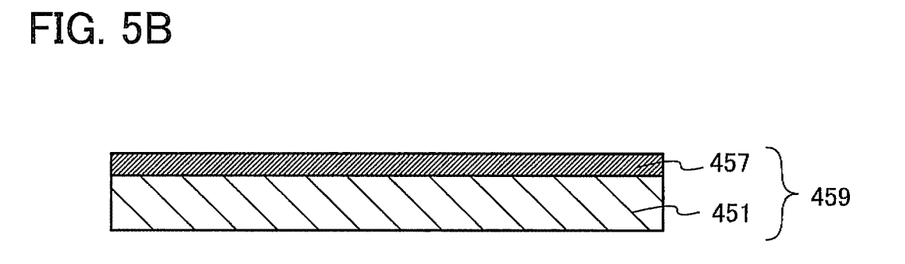

Next, the amorphous silicon layer 453 is subjected to a heat treatment to form a crystalline silicon layer (a negative electrode active material layer 457) (see FIG. 5B).

The crystalline silicon layer that is crystallized by the heat treatment can be used as a negative electrode active material layer. Furthermore, the negative electrode collector 451 and the crystalline silicon layer (the negative electrode active material layer 457) that is formed over the negative electrode collector 451 can be used as a negative electrode 459.

By the heat treatment that is performed on the amorphous silicon layer 453, the catalyst element contained in the negative electrode collector 451 is thermally diffused and moves from the negative electrode collector 451 into the amorphous silicon layer 453. With this, crystal growth of the amorphous silicon layer 453 proceeds from an interface between the amorphous silicon layer 453 and the negative electrode collector 451 to another surface of the amorphous silicon layer 453. Crystal growth proceeds from bottom (the interface with the negative electrode collector 451) to top (the other surface) in a depth direction (film thickness direction) of the amorphous silicon layer 453. Therefore, in the obtained crystalline silicon layer, concentration of the catalyst element becomes lower from bottom to top in the depth direction.

For heat treatment conditions or the like, refer to heat treatment conditions for the amorphous silicon layer 413 described in Embodiment 3. In this embodiment, since the negative electrode collector 451 functions as a catalyst element, processing temperature of crystallization can be lowered and processing time can be shortened. Furthermore, manufacturing cost can be reduced and productivity can be increased.

Also, in this embodiment, since the negative electrode collector 451 itself functions as a catalyst element, a step of adding a catalyst element is unnecessary, and this also leads to reduction in manufacturing cost and increase in productivity.

Also, the catalyst element remaining on the negative electrode active material layer 457 (the crystalline silicon layer) does not need to be removed since it is a metal material with a conductive property.

In the above manner, the negative electrode 459 in which a crystalline silicon layer is used as the negative electrode active material layer can be formed.

A positive electrode of a power storage device is formed using the electrode material described in Embodiment 1. By using a flux when synthesizing the electrode material, a low-temperature heat treatment that is performed in a short amount of time becomes possible, and enlargement of particles of the electrode material can be suppressed. Accordingly, in the case of using in a lithium ion secondary battery an electrode that is formed using a material in which enlargement of particles is suppressed, sufficient speed of lithium ions can be obtained, high-speed charging and discharging become possible, and a characteristic of the power storage device can be improved. Also, by a low-temperature heat treatment that is performed in a short amount time becoming possible, manufacturing cost can be reduced. For a formation method of the positive electrode, refer to Embodiment 1. Furthermore, for an electrolyte, refer to Embodiment 2.

In the above manner, by using the negative electrode described in this embodiment and the positive electrode using the electrode material described in Embodiment 1, a power storage device capable of high-speed charging and discharging can be formed.

This embodiment can be appropriately combined with other embodiments.

Embodiment 5

In this embodiment, a power storage device with a different structure from the structures of the power storage devices in Embodiment 2 to Embodiment 4 will be described.

In this embodiment, a negative electrode includes a collector, a mixed layer of a collector material and an active material, and an active material layer. A metal material is used for the collector, a silicon material is used for a negative electrode active material layer, and a mixed layer of a metal material and a silicon material is used as the mixed layer.

Since the silicon material used for the negative electrode active material layer can theoretically have a larger capacitance than a carbon material, capacitance of a power storage device can be increased, and a characteristic of the power storage device can be improved.

By providing the mixed layer of the collector material and an active material layer material between the collector and the negative electrode active material layer, adhesion between the collector and the active material layer can be improved and donating and accepting of electrons can be made easier. Therefore, further improvement in a characteristic of a power storage device can be realized.

As a material for a positive electrode active material, the material described in Embodiment 1 can be used.

A formation method of a negative electrode will be described with reference to FIGS. 6A to 6C. As a structure of a power storage device, the structure illustrated in FIGS. 1A to 1C can be used. Also, a negative electrode formed in this embodiment corresponds to the negative electrode 2211 in FIGS. 1A to 1C.

Figure 6A:
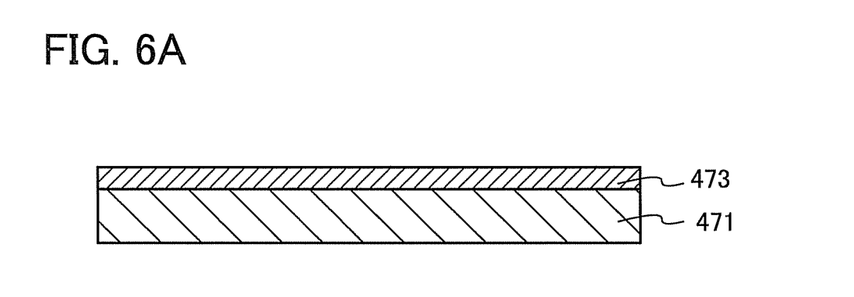
FIGS. 6A to 6C are cross-sectional views illustrating a manufacturing method of a negative electrode of a power storage device.

First, an amorphous silicon layer 473 is formed over a negative electrode collector 471 (see FIG. 6A).

For the negative electrode collector 471, a conductive material such as titanium, nickel, copper, indium, tin, silver, or the like can be used.

The amorphous silicon layer 473 can be formed in the same manner as the amorphous silicon layer 413 described in Embodiment 3.

Figure 6B:
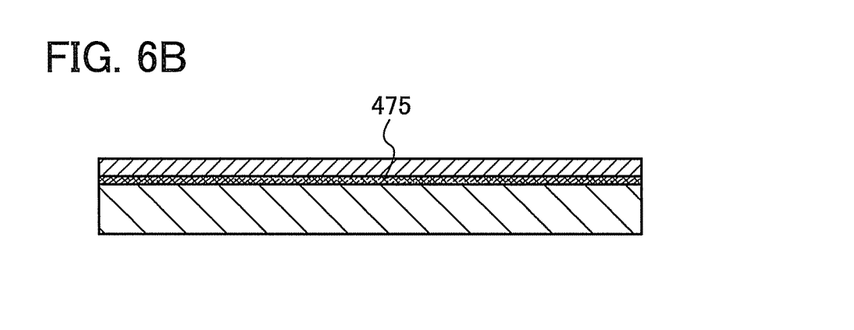
Figure 6C:
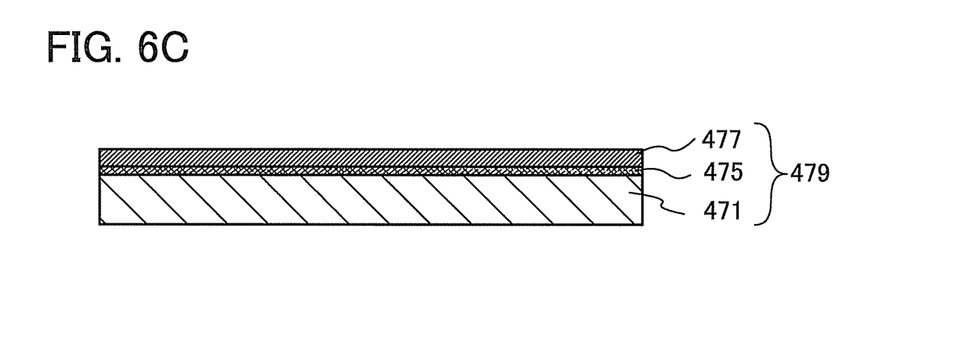

Next, the collector including the amorphous silicon layer 473 is subjected to a heat treatment, and a mixed layer 475 is formed between the collector material and the active material (see FIG. 6B).

In the case that titanium is used for the negative electrode collector 471 for example, a mixed layer of titanium and silicon is formed as the mixed layer 475. The mixed layer of titanium and silicon may be a titanium silicide layer.

By the above-described heat treatment, the amorphous silicon layer 473 may be crystallized to form a crystalline silicon layer (a negative electrode active material layer 477). The crystalline silicon layer that is crystallized by the heat treatment can be used as a negative electrode active material layer. Furthermore, the negative electrode collector 471, the mixed layer 475, the crystalline silicon layer (the negative electrode active material layer 477) can be used as a negative electrode 479 (see FIG. 6C).

Note that the heat treatment in FIG. 6B is performed with a purpose of forming the mixed layer 475. If the amorphous silicon layer 473 is not crystallized to a desired crystallinity by this heat treatment, another heat treatment for further crystallization (including laser beam irradiation) may be performed. Furthermore, for the negative electrode active material layer 477, amorphous silicon or microcrystalline silicon may be used.

By using crystalline silicon for the negative electrode active material layer 477, diffusion rate of lithium ions or the like is higher than in the case of using amorphous silicon, and this contributes to improvement in a characteristic of a power storage device, which is preferable.

In the above manner, the negative electrode 479 in which a crystalline silicon layer is used as the negative electrode active material layer can be formed.

A positive electrode of a power storage device is formed using the electrode material described in Embodiment 1. By using a flux when synthesizing the electrode material, a low-temperature heat treatment that is performed in a short amount of time becomes possible, and enlargement of particles of the electrode material can be suppressed. Accordingly, in the case of using in a lithium ion secondary battery an electrode that is formed using a material in which enlargement of particles is suppressed, sufficient speed of lithium ions can be obtained, high-speed charging and discharging become possible, and a characteristic of the power storage device can be improved. Also, by a low-temperature heat treatment that is performed in a short amount time becoming possible, manufacturing cost can be reduced. For a formation method of the positive electrode, refer to Embodiment 1. Furthermore, for an electrolyte, refer to Embodiment 2.

In the above manner, by using the negative electrode described in this embodiment and the positive electrode using the electrode material described in Embodiment 1, a power storage device capable of high-speed charging and discharging can be formed. Furthermore, in this embodiment, since the mixed layer is formed between the collector and the active material layer, a characteristic (adhesion, ease of donating and accepting electrons, or the like) of an interface between the collector and the active material layer can be improved.

This embodiment can be appropriately combined with other embodiments.

Embodiment 6

In this embodiment, application mode of a power storage device according to one embodiment of the present invention will be described.

The power storage device can be provided in a variety of electronic devices. For example, the power storage device can be provided in cameras such as digital cameras or video cameras, mobile phones, portable information terminals, e-book terminals, portable game machines, digital photo frames, audio reproducing devices, and the like. Moreover, the power storage device can be provided in electrically propelled vehicles such as electric vehicles, hybrid vehicles, electric railway cars, electric working vehicles, electric carts, electric wheel chairs, and electric bicycles.

Characteristics of a power storage device according to one embodiment of the present invention are improved; for example, higher capacitance and a higher charging and discharging rate are obtained. By improving the characteristics of the power storage device, the power storage device can also be compact and lightweight. By providing such a power storage device, electronic devices or electrically propelled vehicles can have a shorter charging time, a longer operating time, and reduced size and weight, and thus their convenience and design can be improved.

Figure 7A:
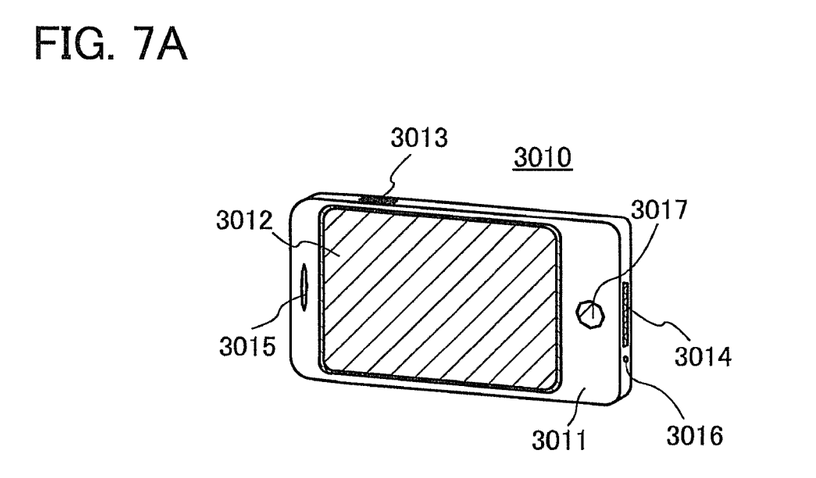
FIGS. 7A and 7B are figures illustrating application modes of a power storage device.

FIG. 7A illustrate an example of a mobile phone. In a mobile phone 3010, a display portion 3012 is incorporated in a housing 3011. The housing 3011 is provided with an operation button 3013, an operation button 3017, an external connection port 3014, a speaker 3015, a microphone 3016, and the like. When a power storage device according to one embodiment of the present invention is provided in such a mobile phone, the mobile phone can have improved convenience and design.

Figure 7B:
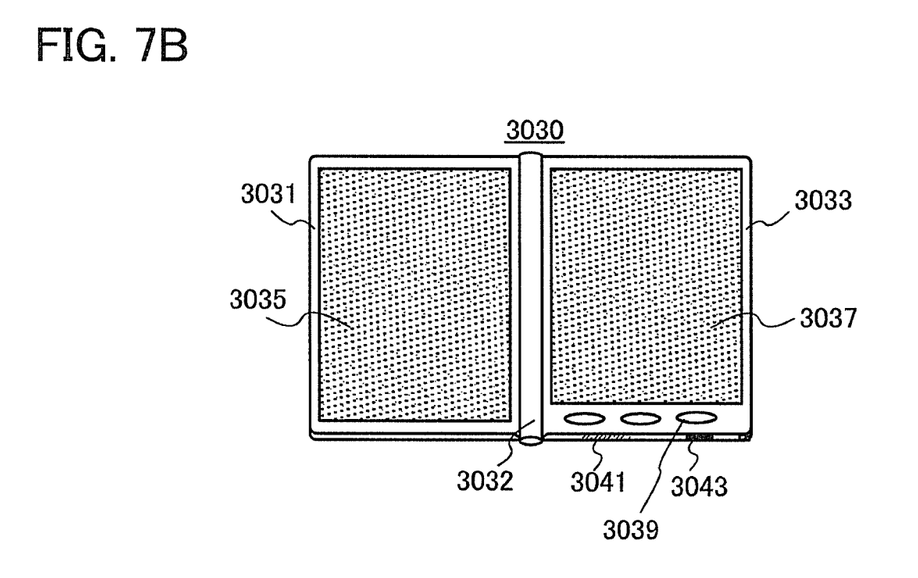

FIG. 7B illustrates an example of an e-book terminal. An e-book terminal 3030 includes two housings, a first housing 3031 and a second housing 3033, which are combined with each other with a hinge 3032. The first housing 3031 and the second housing 3033 can be opened and closed with the hinge 3032 as an axis. A first display portion 3035 and a second display portion 3037 are incorporated in the first housing 3031 and the second housing 3033, respectively. In addition, the second housing 3033 is provided with an operation button 3039, a power source 3043, a speaker 3041, and the like. When a power storage device according to one embodiment of the present invention is provided in such an e-book terminal, the e-book terminal can have improved convenience and design.

Figure 8A:
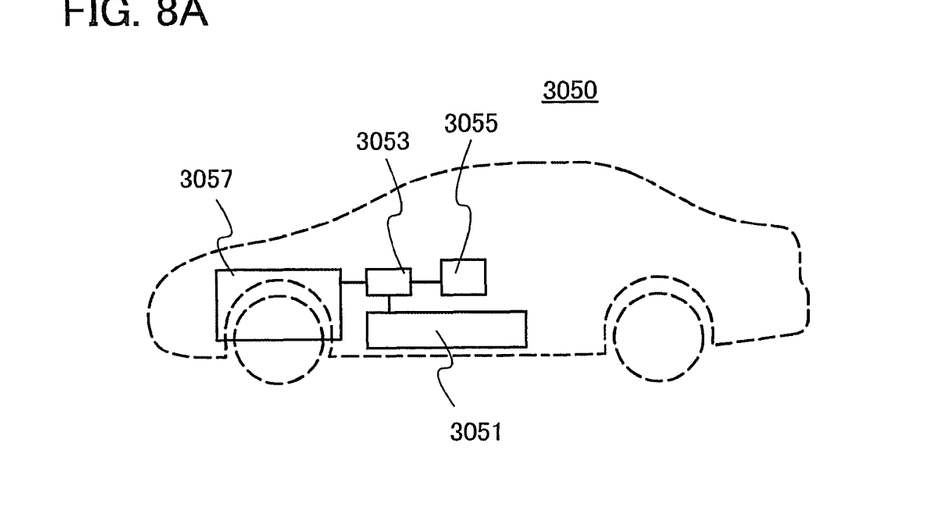
FIGS. 8A and 8B are figures illustrating application modes of a power storage device.

FIG. 8A illustrates an example of an electric vehicle. A power storage device 3051 is provided in an electric vehicle 3050. Outputting of electric power of the power storage device 3051 is adjusted by a control circuit 3053, and is supplied to a driving device 3057. The control circuit 3053 is controlled by a computer 3055.

The driving device 3057 includes a DC motor or an AC motor either alone or in combination with an internal-combustion engine. The computer 3055 outputs a control signal to the control circuit 3053 based on an input data such as data of operation (such as acceleration, deceleration, or stop) by a driver or data during driving (such as data on an uphill or a downhill, or data on a load on a driving wheel) of the electric vehicle 3050. The control circuit 3053 adjusts the electric energy supplied from the power storage device 3051 in accordance with the control signal of the computer 3055 to control the output to the driving device 3057. In the case that the AC motor is provided, an inverter which converts a direct current into an alternate current is also incorporated.

Charging of the power storage device 3051 can be performed by supplying power from outside by a plug-in system. When a power storage device according to one embodiment of the present invention is provided as the power storage device 3051, a charging time can be shortened and convenience can be improved. Furthermore, higher charging and discharging rate of the power storage device can contribute to greater acceleration and performance improvement of the electric vehicle. Also, when the power storage device 3051 itself can be reduced in size and weight as a result of improvements in its characteristics, the vehicle can be reduced in weight and fuel-efficiency can be improved.

Figure 8B:
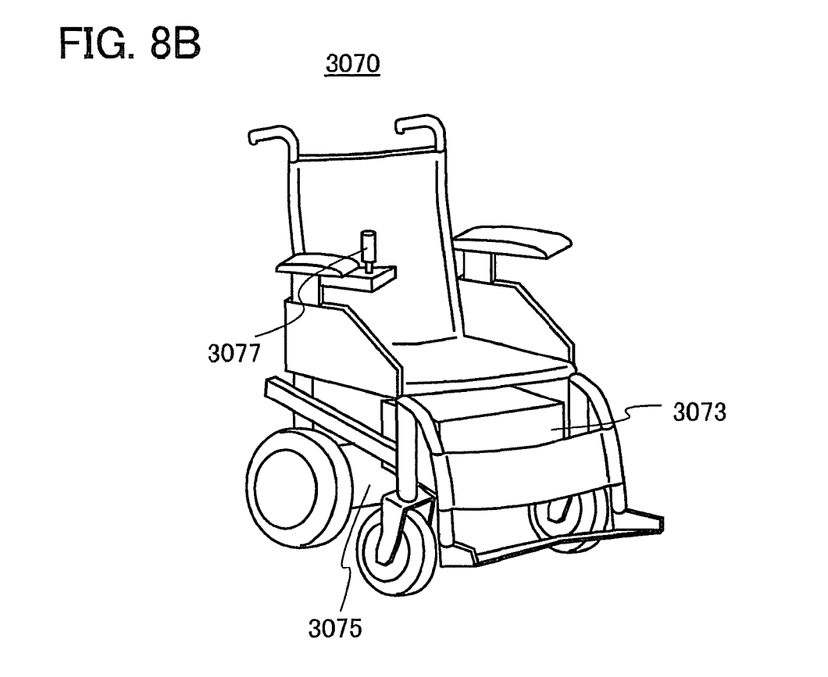

FIG. 8B illustrates an example of an electric wheelchair. A wheelchair 3070 is provided with a control portion 3073 including a power storage device, a power control portion, a control means, and the like. Electric power of the power storage device which its output is adjusted by the control portion 3073 is supplied to a driving portion 3075. Further, the control portion 3073 is connected to a controller 3077. By operation of the controller 3077, the driving portion 3075 can be driven via the control portion 3073, and movement of the wheelchair 3070 such as moving forward/backward, and turning as well as speed can be controlled.

Charging of the power storage device of the wheelchair 3070 can also be performed by supplying power from outside by a plug-in system. When a power storage device according to one embodiment of the present invention is provided as the power storage device of the control portion 3073, a charging time can be shortened and convenience can be improved. Further, when the power storage device itself can be reduced in size and weight as a result of improvements in its characteristics, the user and the wheelchair helper can use the wheelchair 3070 more easily.

Note that in the case that a power storage device is provided in an electric railway car as an electrically propelled vehicle, charging of the power storage device can be performed by supplying power from overhead wires or conductive rails.

This embodiment can be appropriately combined with other embodiments.

This application is based on Japanese Patent Application serial no. 2010-149417 filed with Japan Patent Office on Jun. 30, 2010, the entire contents of which are hereby incorporated by reference.

What is claimed is:

1. A manufacturing method of an electrode material comprising a compound represented by a general formula $A_{2-a}MSiO_4$, wherein A represents an alkali metal, M represents a transition metal, and a represents $0 \leq a < 2$, comprising the steps of:
  mixing a first compound including A of the general formula, a second compound including M of the general formula, and a third compound including Si of the general formula to form a mixed material;
  subjecting the mixed material to a first heat treatment at a temperature of 400° C. or lower;
  pulverizing the mixed material;
  mixing a flux into the mixed material after subjecting to the first heat treatment and the pulverizing step; and
  subjecting the mixed material into which the flux is mixed to a second heat treatment at a temperature of 700° C. or lower in an inert gas atmosphere.

2. The manufacturing method of the electrode material according to claim 1, wherein A is Li, and a is 0.

3. The manufacturing method of the electrode material according to claim 1, wherein M contains one of iron, manganese, cobalt, and nickel.

4. The manufacturing method of the electrode material according to claim 1, wherein the flux is one or a plurality of the following compounds: lithium chloride, sodium chloride, rubidium chloride, calcium chloride, and magnesium chloride.

5. The manufacturing method of the electrode material according to claim 1, wherein the inert gas atmosphere is an atmosphere containing one or a plurality of the following: nitrogen, helium, neon, argon, and xenon.

6. A manufacturing method of an electrode material comprising a compound represented by a general formula $A_{2-a}MSiO_4$, wherein A represents an alkali metal, M represents a transition metal, and a represents $0 \leq a < 2$, comprising the steps of:
  mixing a first compound including A of the general formula, a second compound including M of the general formula, and a third compound including Si of the general formula to form a mixed material;
  subjecting the mixed material to a first heat treatment at a temperature of 400° C. or lower;
  pulverizing the mixed material;
  mixing an alkali metal chloride into the mixed material after subjecting to the first heat treatment and the pulverizing step; and
  subjecting the mixed material into which the alkali metal chloride is mixed to a second heat treatment at a temperature of 700° C. or lower in an inert gas atmosphere.

7. The manufacturing method of the electrode material according to claim 6, wherein A is Li, and a is 0.

8. The manufacturing method of the electrode material according to claim 6, wherein M contains one of iron, manganese, cobalt, and nickel.

9. The manufacturing method of the electrode material according to claim 6, wherein the alkali metal chloride is one or a plurality of the following compounds: lithium chloride, sodium chloride, potassium chloride, and rubidium chloride.

10. The manufacturing method of the electrode material according to claim 6, wherein the inert gas atmosphere is an atmosphere containing one or a plurality of the following: nitrogen, helium, neon, argon, and xenon.

11. A manufacturing method of an electrode material comprising a compound represented by a general formula $A_{2-a}MSiO_4$, wherein A represents an alkali metal, M represents a transition metal, and a represents $0 \leq a < 2$, comprising the steps of:
  mixing a first compound including A of the general formula, a second compound including M of the general formula, and a third compound including Si of the general formula to form a mixed material;
  subjecting the mixed material to a first heat treatment at a temperature of 400° C. or lower;
  pulverizing the mixed material;
  mixing an alkali earth metal chloride into the mixed material after subjecting to the first heat treatment and the pulverizing step; and
  subjecting the mixed material into which the alkali earth metal chloride is mixed to a second heat treatment at a temperature of 700° C. or lower in an inert gas atmosphere.

12. The manufacturing method of the electrode material according to claim 11, wherein A is Li, and a is 0.

13. The manufacturing method of the electrode material according to claim 11, wherein M contains one of iron, manganese, cobalt, and nickel.

14. The manufacturing method of the electrode material according to claim 11, wherein the alkali earth metal chloride is one or both of calcium chloride and magnesium chloride.

15. The manufacturing method of the electrode material according to claim 11, wherein the inert gas atmosphere is an atmosphere containing one or a plurality of the following: nitrogen, helium, neon, argon, and xenon.

* * * * *